United States Patent [19]

Mitchell

[11] 4,192,406

[45] Mar. 11, 1980

[54] SAW HORSE BRACE

[76] Inventor: John R. Mitchell, 6300 Sherman St., Philadelphia, Pa. 19144

[21] Appl. No.: 950,305

[22] Filed: Oct. 11, 1978

[51] Int. Cl.$^{2}$ .......... F16M 11/00

[52] U.S. Cl. .......... 182/185; 248/300

[58] Field of Search .......... 182/181-185, 182/224, 153; 248/300

[56] References Cited

U.S. PATENT DOCUMENTS

| | | | |
|---|---|---|---|
| 1,597,555 | 8/1926 | Tolmie | 182/224 |
| 1,780,579 | 11/1930 | Crowley | 182/224 |
| 1,797,543 | 3/1931 | Bryan | 182/224 |
| 2,105,979 | 1/1938 | Manley | 182/224 |
| 2,330,766 | 9/1943 | Walstrom | 182/224 |

*Primary Examiner*—Reinaldo P. Machado
*Attorney, Agent, or Firm*—Robert K. Youtie

[57] ABSTRACT

A brace or bracket for use in a saw horse together with suitable lumber, such as two-by-four's, including spaced side and end walls in a generally box-like configuration with the bottom and top open, the end walls being upwardly convergent for conforming reception within the walls of downwardly diverging legs, the side walls having aligned openings for passage therethrough of a cross member extending between the received legs. From the open upper end of the box-like structure upstand corner pieces defining therebetween notches for receiving additional cross members. The foregoing described structure is used conjointly with a similar structure and joined thereto by a selected cross member.

9 Claims, 6 Drawing Figures

SAW HORSE BRACE

BACKGROUND OF THE INVENTION

While saw horses and saw horse brackets or braces have been long employed, prior constructions have imposed some difficulties in use. For example, prior saw horse constructions employed the horizontal or saw horse cross members as work supports, thereby placing the supporting cross members in position to obstruct many saw cuts. This often required rearrangement of the work during operation thereon, and other inconvenient manipulations. The work movement relative to the support or cross member, or inadvertent cutting of the cross member, can produce undesirable hazards to safety, as well as inconvenience. Sometimes it is necessary to clamp the work to a saw horse, which further compounds the difficulties encountered with prior art saw horses.

While certain prior art proposals have attempted to overcome these problems, such as in the disclosures of prior U.S. Pat. Nos. 3,042,144 and 4,031,981, the proposals thereof have not been satisfactory, and accordingly have not met with general acceptance.

SUMMARY OF THE INVENTION

It is, therefore, an important object of the present invention to provide a saw horse brace of the type described above, which affords an extreme degree of versatility and flexibility for use in a wide variety of practical situations wherein work may be supported and cut without the inconvenience of work movement during the cutting operation.

It is another object of the present invention to provide a saw horse brace which permits of a wide variety of cuts in supported work without danger of or resulting in cutting of the supporting member.

It is still another object of the present invention to provide a saw horse brace having the advantageous characteristics mentioned in the preceding paragraphs, which is extremely simple in construction for economy of cost, adapted to be economically mass produced from a single sheet metal blank, and which is staunch and durable for a long useful life.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 1:
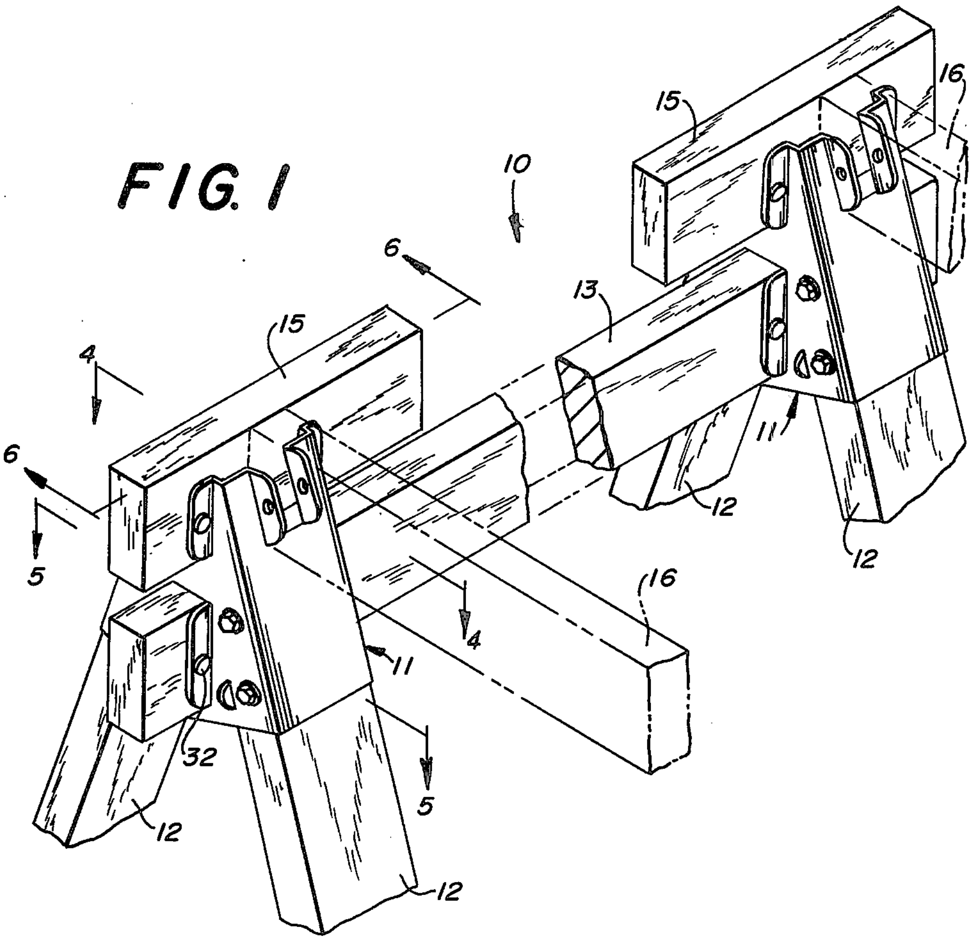
FIG. 1 is a top perspective view showing a saw horse constructed in accordance with the teachings of the present invention, and illustrating certain pieces in phantom.

Referring now more particularly to the drawings, and specifically to FIG. 1 thereof, a saw horse is there generally designated 10, which may include a pair of braces or brackets 11 each provided with a pair of downwardly divergent legs 12, and may include a cross piece or horizontal member 13 extending between the braces 11. A pair of additional, generally horizontal cross pieces or work support members 15 may each be carried by a respective brace 11 located in horizontally spaced relation over an adjacent end of cross member 13. Additionally, or alternatively, there may be provided cross wise members or work supports, as shown in phantom at 16, generally horizontally level with respective work supporting cross members 15 and extending generally normal thereto.

Figure 3:
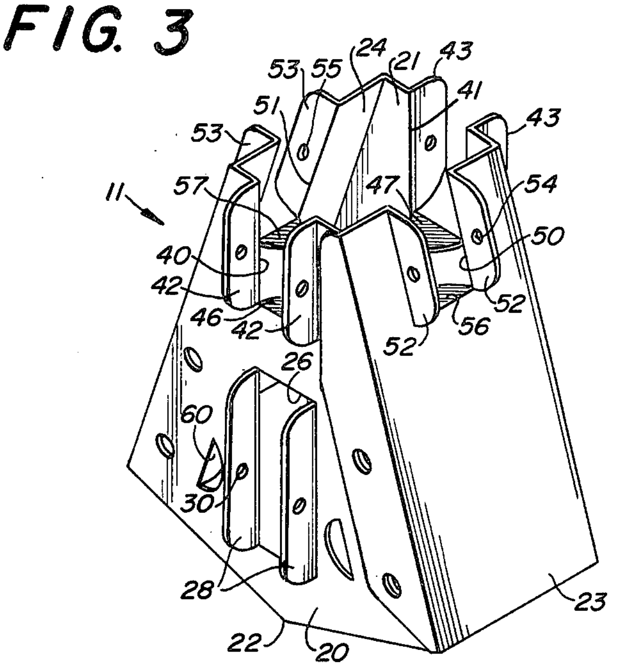
FIG. 3 is a top perspective view showing the saw horse brace of the present invention apart from the saw horse.
Figure 4:
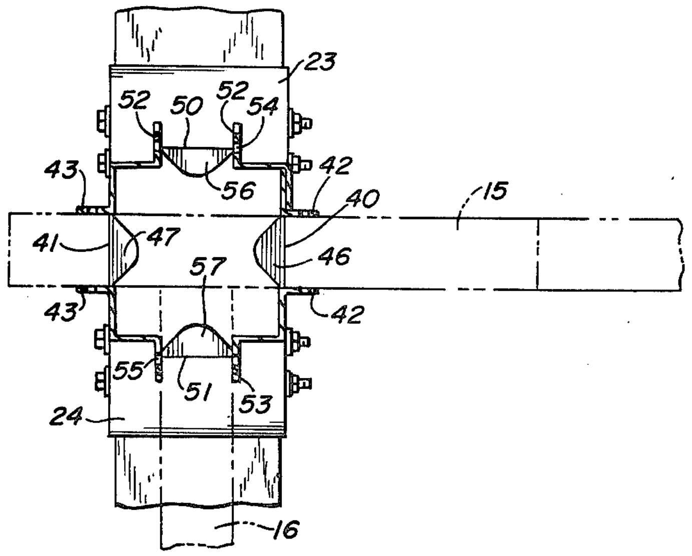
FIG. 4 is a generally horizontal sectional view taken generally along the line 4—4 of FIG. 1.

Referring now to FIG. 3, a saw horse bracket or brace 11 is there seen apart from a saw horse. The brace or bracket may include a pair of normally vertically disposed, parallel spaced, facing side walls 20 and 21, which are of an upwardly tapering configuration. Overall each side wall 20 and 21 may be somewhat trapezoidal in outline configuration, being symmetrically tapering upwardly. If desired, the lower edge of each side wall 20, 21 may converge downwardly to a medial point, as at 22 in FIG. 3.

Extending between the side walls 20 and 21 are a pair of generally rectangular, upwardly convergent end walls 23 and 24. The end walls 23 and 24 may each extend between an adjacent pair of inclined side edges of side walls 20 and 21, so that the walls 20, 21, 23 and 24 combine to define a generally upwardly tapering, internally hollow box-like structure having its lower and upper ends open.

In lower laterally medial regions of the side walls 20 and 21, there may be formed generally rectangular through holes or openings 26 and 27. The through holes or openings 26 and 27 are vertically elongate and horizontally aligned for reception therethrough of a saw horse back or cross member 13, and provided along opposite sides of each opening with a pair of securement flaps, as at 28 on opposite sides of opening 26, and as at 29 on opposite sides of opening 27. The securement flaps may be formed from the material of the respective side walls 20 and 21, and adapted for securement to a received cross member 13, as by the provision of fastener receiving holes 30 and 31, say for receiving a fastener 32, see FIG. 1.

Further, the lower and upper ends of respective side wall openings 26 and 27 are formed with inturned lips or tabs, as at 34 and 35 at the lower and upper ends of opening 26, and as at 36 and 37 as at the lower and upper ends of opening 27. The lips or tabs 34-37 may be formed from the material of the side walls and bent out of the planes thereof. The lips or tabs 34-37 aid to guide, support and restrain a received cross member 13.

Directly above and spaced over each opening 26 and 27, the side walls 20 and 21 are respectively formed with cutouts or notches 40 and 41, which are generally rectangular in configuration and open upwardly through the upper ends of the respective side walls. The notches 40 and 41 are provided along the side edges with outwardly projecting securement flaps, as at 42 and 43, respectively. The flaps 42 and 43 may be provided with fastener receiving apertures, as at 44 and 45 for securement to a cross member 15 received in the notches. In addition, a lip or tab may extend inwardly from the lower edge of each notch 40, 41, as at 46, 47 for supporting engagement with the underside of a received cross member 15.

The upper regions of the end walls 23 and 24, laterally medially thereof, are respectively formed with upwardly opening, generally rectangular notches 50 and 51. The side edges of the notches 50 and 51 are provided with outwardly projecting securement flaps, as at 52 and 53, having suitable fastener receiving means or holes 54 and 55. The end wall upper edge notches 50 and 51 are adapted to receive horizontal members 16 and be secured thereto, if desired.

The upper end wall notches 50 and 51 are generally horizontally level with the upper side wall notches 40 and 41. Further, the lower edges of the end wall notches 50 and 51 are provided with inwardly extending tabs or lips, as at 56 and 57. The tabs or lips 56 and 57 may serve to guide and support the lower surface of a horizontal cross member or support 16.

It will now be appreciated that each of the side and end walls 20, 21 and 23, 24 has its upper edge cutout or notched in a laterally medial location, leaving between the cutouts or notches upstanding wall junctions or corners in a generally castellated configuration.

The upwardly and inwardly inclined end walls 23 and 24 provide on their under or inner surfaces for engagement with respective saw horse legs 12. That is, the upper regions of the legs 12 extend closely adjacent to the undersides of respective end walls 23 and 24, the inturned tabs or lips 56 and 57 defining limits or stops for abutting engagement with the upper ends of respective legs 12.

Figure 5:
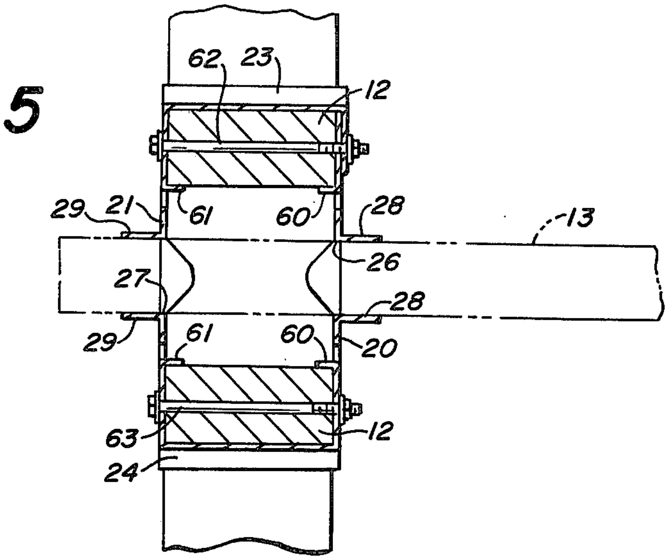
FIG. 5 is a generally horizontal sectional view taken along the line 5—5 of FIG. 1.
Figure 6:
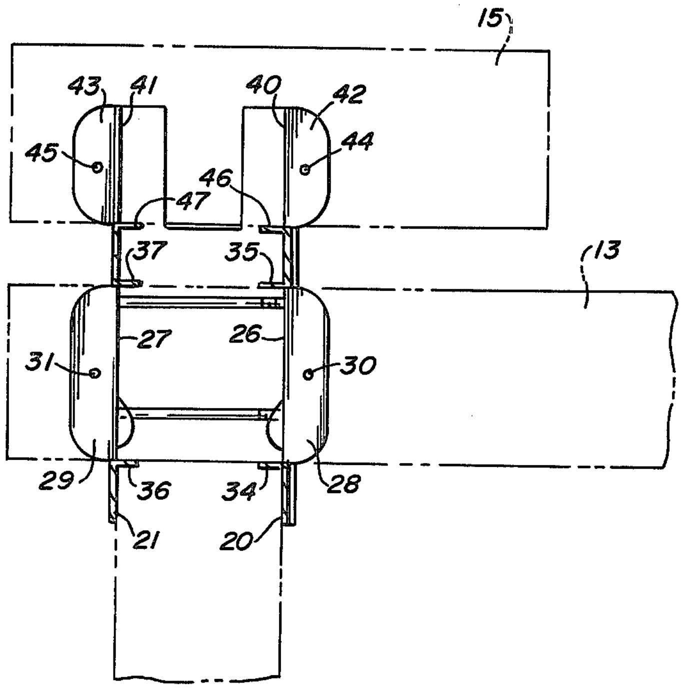
FIG. 6 is a sectional elevation view taken generally along the line 6—6 of FIG. 1.

Further, the side walls 20 and 21 are each provided at locations adjacent to and spaced from respective end walls 23 and 24 with inturned guide tabs or lips 60 and 61, best seen in FIG. 5. It will also there be seen that the guide tabs or lips 60 and 61 are spaced from and combine with the walls 23 and 24 to receive therebetween the upper end portions of legs 12.

There may advantageously be provision for the insertion of suitable fastener means, such as bolts 62 and 63 between side walls 20 and 21, located in adjacent, parallel spaced relation with respective end walls 23 and 24 for passage through and positive securement in position of the legs 12.

As is well known, saw horses are often used in pairs, say adjacent to opposite ends of a 4 ft. by 8 ft. panel, or other work piece. In the solid line embodiment shown in FIG. 1, the pair of spaced work supports 15 permit of a cut of the work piece through the space between members 15 without obstruction by the saw horse. Additionally, or alternatively, the work support pieces 16, shown in phantom, may be employed to afford different support to a work piece. Obviously, a saw horse 10 can be employed in a great variety of combinations and arrangements for conveniently supporting a work piece while permitting cutting of the work piece without obstruction or impairment by the saw horse.

Figure 2:
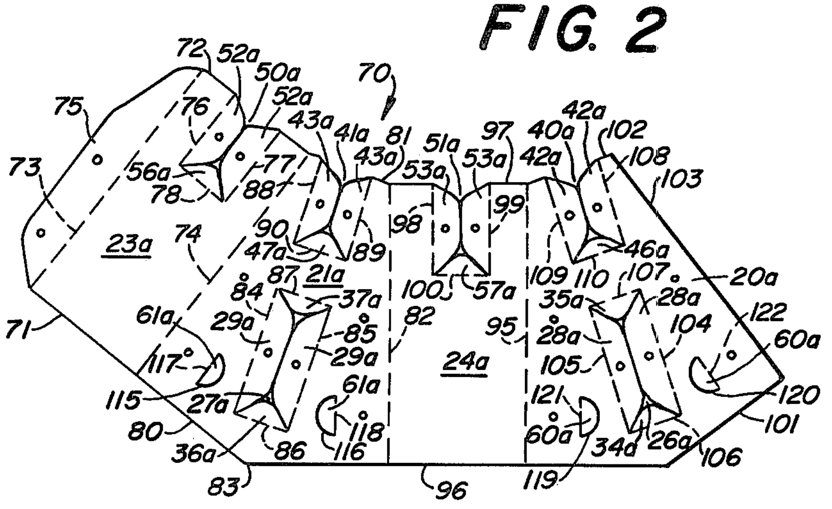
FIG. 2 is a plan view showing a blank of the present invention adapted to form a saw horse brace in accordance with the teachings of the instant invention.

While the saw horse brace 11 may be produced in any desired manner, it is believed advantageous to fabricate the brace from a single, integral sheet of stiff bendable material, such as aluminum, steel, or the like. A blank 70 is shown in FIG. 2 adapted to be formed into a saw horse brace 11. The blank 70 may be a single integral sheet of stiff bendable material, such as aluminum, cut to provide a generally rectangular end wall panel 23*a* bounded within a pair of parallel spaced transverse edges 71 and 72, and a pair of parallel spaced longitudinal foldlines 73 and 74. A closure or securement flap 75 may extend from the foldline 73, for a purpose appearing presently. Extending into the transverse edge 72, medially between the longitudinal foldlines 73 and 74 is a notch 50*a* bounded within longitudinal foldlines 76 and 77, and a transverse inner end foldline 78. Extending from the longitudinal foldlines 76 and 77 into the notch 50*a* are flaps 52*a*, and extending into the notch 50*a* from the foldline 78 is a tab 56*a*.

Disposed longitudinally alongside of the rectangular panel 23*a* is a generally trapezoidal panel 21*a*, extending from the foldline 74 and co-extensive therewith. The trapezoidal panel 21*a* is bounded within a larger transverse edge 80 and smaller transverse edge 81, and between the foldline 74 and an additional foldline 82 which converges toward the foldline 74 in the direction between edge 80 and edge 81.

The transverse edge 80 may be generally angulate, having a laterally medial juncture or corner 83. Formed adjacent to the transverse edge 80 of panel 21*a* may be a generally rectangular opening 27*a* extending generally along a bisector of the angle between foldlines 74 and 82. The opening 27*a* is adjacent to and spaced from the transverse edge 80, being elongate generally longitudinally of the panel 21*a* and bounded within generally parallel spaced side foldlines 84 and 85, and transversely extending parallel spaced end foldlines 86 and 87. Extending into the opening 27*a* from side foldlines 84 and 85 are securement flaps 29*a*, and extending into the opening 27*a* from transverse foldlines 86 and 87 are end tabs or lips 36*a* and 37*a*.

In general alignment with the opening 27*a*, extending inwardly from the transverse edge 81, laterally medially thereof, is a notch 41*a* bounded on opposite sides by parallel foldlines 88 and 89, and bounded at its inner end by a transverse foldline 90. Extending inwardly from longitudinal foldlines 88 and 89 are securement flaps 43*a*, while a lip or tab 47*a* extends inwardly from the foldline 90.

Disposed generally longitudinally of the generally trapezoidal panel 21*a* is a generally rectangular panel 24*a*, extending from the foldline 82 and bounded within the latter foldline and a generally parallel foldline 95, and between transverse edges 96 and 97. The transverse edge 96 extends from the edge 80 of adjacent panel 21*a*, and the transverse edge 97 extends from the edge 81 of the adjacent panel.

A cutout or notch 51*a* extends inward through the edge 97 laterally medially thereof, being bounded on opposite sides by longitudinal foldlines 98 and 99, and bounded at its inner end by a transverse foldline 100. A pair of flaps 53*a* may extend from foldlines 98 and 99 into notch 51*a*, and tab or lip 57*a* may extend from foldline 100 into notch 51*a*.

A remaining generally trapezoidal panel 20*a* is disposed longitudinally along and generally coextensive with rectangular panel 24*a*, being bounded within transverse edges 101 and 102, the foldline 95 and a longitudinal edge 103. Laterally medially of panel 20*a* is formed a generally rectangular, longitudinally extending opening 26*a* bounded within longitudinal foldlines 104 and 105, and transverse foldlines 106 and 107. Flaps 28*a* extend into opening 26*a* from foldlines 104 and 105, and tabs 34a and 35a extend inwardly from foldlines 106 and 107.

Extending inwardly from a transverse edge 102, medially thereof and in alignment with opening 26a is a notch 40a bounded within longitudinal foldlines 108 and 109 and a transverse inner end foldline 110. Securement flaps 42a extend inwardly from respective foldlines 108 and 109, and an inner end flap or tab 46a extends from foldline 110.

Additionally, the panel 21a may be formed with a pair of arcuate, generally semi-circular cuts 115 and 116 and respective chordal foldlines 117 and 118, respectively adjacent to panel bounding foldlines 74 and 82. The cut 115 and foldline 117 combine to define a tab 61a adjacent to foldline 74, and the cut 116 and fold 118 combine to define a tab 61a adjacent to foldline 82.

Similarly, generally trapezoidal panel 20a is formed with a pair of arcuate, generally semi-circular cuts 119 and 120, with respective chordal foldlines 121 and 122. The cut 119 and foldline 121 combining to define a tab 60a adjacent to panel bounding foldline 95, and the cut 120 and foldline 122 combining to define a tab 60a adjacent to panel bounding edge 103.

The blank 70 may be folded along lines 74, 82, 95 and 93 to form the generally open ended upwardly convergent box-like structure with flap 75 overlapping panel 20a along edge 103 and suitably secured thereto as by tack welding or other desired securing means. The several securement flaps and tabs or lips are all bent along their respective foldlines to assume the configuration shown in FIGS. 3-6 for association with suitable lumber, say 2 inch by 4 inch lumber, to form a saw horse of the desired characteristics.

From the foregoing, it will be understood that the present invention provides a saw horse brace or bracket which is extremely simple in construction, capable of economic manufacture for sale at a reasonable price, uniquely versatile in use for supporting work without obstructing cutting thereof, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A saw horse brace comprising a pair of facing spaced side walls, a pair of spaced upwardly convergent end walls extending between said side walls for conforming reception there within of a pair of downwardly diverging legs, said side walls having aligned through openings for passage therethrough of a cross member between the upper ends the legs, and four corner pieces upstanding from the junctures of said side and end walls, said corner pieces combining to define pairs of aligned notches for receiving additional cross members.

2. A saw horse brace according to claim 1, one pair of aligned notches being spaced over said openings, the other pair of aligned notches being generally level with said one pair of aligned notches.

3. A saw horse brace according to claim 2, in combination with securement tabs attached to said notches to secure to cross members in said notches.

4. A saw horse brace according to claim 3, said side and end walls, corner pieces and securement tabs being integrally fabricated of a single sheet cut and bent to define said walls, pieces and tabs.

5. A saw horse brace according to claim 1, said side and end walls being integrally fabricated of a single sheet cut and bent to define said and end walls, said single sheet comprising a first generally rectangular panel defining one of said end walls, a first generally trapezoidal panel extending from one edge of said first generally rectangular panel and tapering in one direction longitudinally of said first generally rectangular panel to define one of said side walls, a second generally rectangular panel extending from said first generally trapezoidal panel opposite to said first generally rectangular panel to define the other end wall, and a second generally trapezoidal panel extending from said second generally rectangular panel opposite to said first generally trapezoidal panel to define the other side wall.

6. A saw horse brace according to claim 5, in combination with a pair of spaced extensions on each of said panels with the extensions of adjacent panels being integral to define four upstanding corner pieces.

7. A saw horse brace according to claim 1, in combination with locating tabs struck out of said side walls in spaced relation with said end walls and combining with the latter to maintain legs against said end walls.

8. A saw horse brace according to claim 7, in combination with outstanding flaps adjacent to said openings for securement to a cross member in said openings.

9. A saw horse brace according to claim 1, one pair of aligned notches being in said side walls over said openings, the other pair of aligned notches being in said end walls, and stop lips extending from the lower ends of said other pair of notches for limiting engagement with a pair of legs.

* * * * *